(12) United States Patent
Hikida

(10) Patent No.: US 10,428,460 B2
(45) Date of Patent: Oct. 1, 2019

(54) METHOD FOR MOLDING CNF AND MOLDED PRODUCT OF CNF OBTAINED BY THE MOLDING METHOD

(71) Applicant: CHUETSU PULP & PAPER CO., LTD, Takaoka-shi, Toyama (JP)

(72) Inventor: Shinichi Hikida, Takaoka (JP)

(73) Assignee: CHUETSU PULP & PAPER CO., LTD., Toyama (JP)

( * ) Notice: Subject to any disclaimer, the term of this patent is extended or adjusted under 35 U.S.C. 154(b) by 145 days.

(21) Appl. No.: 15/526,465

(22) PCT Filed: Nov. 12, 2015

(86) PCT No.: PCT/JP2015/081830
§ 371 (c)(1),
(2) Date: May 12, 2017

(87) PCT Pub. No.: WO2016/076385
PCT Pub. Date: May 19, 2016

(65) Prior Publication Data
US 2017/0314201 A1  Nov. 2, 2017

(30) Foreign Application Priority Data
Nov. 14, 2014 (JP) .................................. 2014-231452

(51) Int. Cl.
*D21H 11/18* (2006.01)
*D21J 3/00* (2006.01)
(Continued)

(52) U.S. Cl.
CPC ............. *D21H 11/18* (2013.01); *C08B 15/08* (2013.01); *D21H 11/16* (2013.01); *D21H 15/02* (2013.01); *D21J 3/00* (2013.01); *Y02P 20/149* (2015.11)

(58) Field of Classification Search
None
See application file for complete search history.

(56) References Cited

U.S. PATENT DOCUMENTS

2012/0277351 A1\* 11/2012 Yano .................. D21D 1/34
524/35
2016/0016717 A1\* 1/2016 Toubeau ............ B01D 39/1607
220/62.13

FOREIGN PATENT DOCUMENTS

JP    10-337791 A    12/1998
JP    11-93100 A     4/1999
(Continued)

OTHER PUBLICATIONS

Smook, Gary A., Handbook for Pulp and Paper Technologists, 2nd ed, Angus Wilde Publications, 1992, pp. 228. (Year: 1992).\*
(Continued)

*Primary Examiner* — Dennis R Cordray
(74) *Attorney, Agent, or Firm* — Sughrue Mion, PLLC

(57) ABSTRACT

A porous body is placed in a rectangular parallelepipedal casing made of a stainless steel to prepare a mold form. A CNF-containing slurry is charged into the mold form, and another porous body is placed on the CNF-containing slurry. If the CNF-containing slurry are enwrapped in a nylon mesh, leakage of the CNF-containing slurry from a gap between the mold form and the porous body or clogging of the porous bodies can be inhibited. The upper and lower porous bodies are heated while applying a load to the CNF-containing slurry for a desired period of time to effect hot pressing, thereby obtaining a desired molded product. This provides a method for molding CNFs which enables a CNF molded product having a three-dimensional configuration to be obtained at a high productivity, and the CNF molded product obtained by the method for molding CNFs.

3 Claims, 5 Drawing Sheets

(51) Int. Cl.
*C08B 15/08* (2006.01)
*D21H 11/16* (2006.01)
*D21H 15/02* (2006.01)

(56) References Cited

FOREIGN PATENT DOCUMENTS

| | | |
|---|---|---|
| JP | 11-222794 A | 8/1999 |
| JP | 2000-054300 A | 2/2000 |
| JP | 2001-123400 A | 5/2001 |
| JP | 2011-038031 A | 2/2011 |

OTHER PUBLICATIONS

International Search Report for PCT/JP2015/081830, dated Feb. 2, 2016.

* cited by examiner

METHOD FOR MOLDING CNF AND MOLDED PRODUCT OF CNF OBTAINED BY THE MOLDING METHOD

CROSS REFERENCE TO RELATED APPLICATIONS

This Application is a National Stage of International Application No. PCT/JP2015/081830 filed Nov. 12, 2015, claiming priority based on Japanese Patent Application No. 2014-231452 filed Nov. 14, 2014, the contents of all of which are incorporated herein by reference in their entirety.

TECHNICAL FIELD

The present invention relates to a method for molding CNF and a molded product of CNF obtained by the molding method.

BACKGROUND ART

It is known that cellulose is produced as a fibrous form in nature by plants, for example, woody plants such as hardwoods and softwoods, and herbaceous plants such as bamboo and reed, some animals typified by sea squirt, and some fungi typified by acetobacter, and the like. Cellulose molecules having a structure of aggregate in a fibrous form are called a cellulose fiber. In particular, a cellulose fiber having a fiber width of 100 nm or less and an aspect ratio of 100 or more is generally called a cellulose nanofiber (hereinafter referred to as CNF) and has excellent properties such as light weight, high mechanical strength and low coefficient of thermal expansion.

In nature, a CNF does not exist in the form of a single fiber except those produced by some fungi typified by acetobacter. Most of CNFs exist in a firmly aggregated form by interaction typified by hydrogen bonding between CNFs, which form has a micro-size fiber width. Fibers having such a micro-size fiber width exist in a further highly aggregated form.

In a papermaking process, wood is fibrillated by a pulping method typified by a kraft cooking method as one of chemical pulping methods to a state of pulp having a micro-size fiber width, and paper is prepared using the pulp as a starting material. The fiber width of pulp varies depending upon a starting material and is about 5-20 µm, about 20-80 µm and about 5-20 µm with respect to bleached hardwood kraft pulp, bleached softwood kraft pulp and bleached bamboo kraft pulp, respectively.

As described above, such pulp having a micro-size fiber width is an aggregate of single fibers which has a fibrous form and in which CNFs are firmly aggregated by interaction typified by hydrogen bonding, and CNFs as single fibers having a nano-size fiber width are obtained by further advancing fibrillation.

With respect to a CNF molded product, Patent Document 1 discloses a method for preparing a CNF molded product, which comprises steps of bringing a surface of a porous substrate into contact with a liquid containing one or more solvents and one or more polymers, and removing the one or more solvents by means of the porous substrate to bring solid content concentration of the liquid to 4% or more. A CNF molded product is thereby obtained. As the polymer used in this method for preparing a CNF molded product, fibrous polymers of 1 nm to 500 nm in the minor axis direction and 500 nm to 1000 µm in the major axis direction are mentioned.

With a view to providing a material which is lightweight and substantially free from combustion residue at the time of disposal and which has a high mechanical strength. Patent Document 2 discloses a high mechanical strength material having a density of 1.2 $g/cm^3$ to 1.4 $g/cm^3$, a flexural strength of 200 MPa or more and a flexural modulus of 14 GPa or more, which is obtained by hot-pressing cellulose nanofibers having an average fiber diameter of 10 to 100 nm and an average aspect ratio of 1000 or more under high pressure.

PRIOR ART DOCUMENTS

Patent Documents

Patent Document 1: Japanese Unexamined Patent Publication No. 2011-038031
Patent Document 2: Japanese Unexamined Patent Publication No. 2013-11026

SUMMARY OF THE INVENTION

Problem to be Solved by the Invention

Although the molded product obtained by the method for preparing a molded product disclosed in Patent Document 1 is referred to as "molded product", the molded product prepared in each Example has a thickness of 10 µm. Such a molded product should be considered as nothing more than a sheet having a planar shape but not considered as a three-dimensional molded product.

According to Patent Document 2, a CNF sheet having a thickness of 2 mm is prepared as a high mechanical strength material. However, since the CNF sheet is prepared without using a mold, a molded product having an arbitrary shape cannot be obtained. Further, control of CNF concentration by means of a dryer is difficult, and it is necessary to adjust optimum drying time according to change of a thickness of a molded product which is to be obtained. If a time of drying by means of a dryer is too long, there is undesired possibility of shrinkage of a molded product to be obtained. On the other hand, if a time of drying by means of a dryer is too short, a molded product resulting from such short time drying is likely to contain a large amount of water and thus there is undesired possibility of crazing of the molded product due to emitted water vapor. For these reasons, it is impossible to obtain a molded product having such a sophisticated three dimensional configuration that the molded product has different thicknesses depending on its sites.

SUMMARY OF THE INVENTION

Problem to be Solved by the Invention

In view of the above-described problems in the conventional techniques, it is an object of the present invention to provide a method for molding CNFs in which drying conditions are controlled with ease and which enables a CNF molded product to be obtained at a high productivity that is substantially free from shrinkage or crazing and has a stable sophisticated three dimensional configuration, and the CNF molded product obtained by the method for molding CNFs.

Means to Solve the Problem

A method for molding CNFs according to the present invention characteristically comprises steps of:

charging a CNF-containing slurry into a mold form at least partly composed of a vapor-permeable means; and applying a load to the CNF-containing slurry using the vapor-permeable means of the mold form and/or other vapor-permeable means than that of the mold form, while heating the CNF-containing slurry and/or putting the CNF-containing slurry under reduced pressure.

As the vapor-permeable means, a porous body made of a porous material may be mentioned. As the porous material, various materials such as metals, ceramic, resins and the like may be used. These materials may be used alone or in combination according need.

As a technique to promote permeation, there may be mentioned use of a vapor-permeable material to effect concentration. As the vapor-permeable material, there may be mentioned a fabric, a felt, a material with permeation aids such as holes, a material made of combined plates and rods, a porous material, a mass of particles (a mass of particles such as sand particles, silica particles which forms a pseudo-porous material structure) and the like. These may be used alone or in combination. There is no particular restriction with respect to the direction of load application and the direction in which vapor is permitted to permeate. By the use of a mold form and a vapor-permeable material to effect condensation and by the use of a vapor-permeable material which has been formed into an arbitrary shape to effect condensation, CNFs can be molded into an arbitrary shape.

A CNF molded product according to the present invention is obtained by the method for molding CNFs of the present invention and characteristically has a uniform phase formed by drying a CNF-containing slurry charged into a mold form substantially at a time.

Such a CNF molded product of the present invention may be obtained in an arbitrary three-dimensional form such as a plate-like form, a spherical form, a concavo-convex form or the like. The expression "a CNF-containing slurry charged into a mold form substantially at a time" means that in obtaining a CNF molded product, no CNF-containing slurry is additionally charged into a mold form once the application of the load by means of the vapor-permeable means is initiated.

Further, a method for molding CNFs according to the present invention characteristically comprises steps of:

charging a CNF-containing slurry into a mold form at least partly composed of a vapor-permeable means;

applying a load to the CNF-containing slurry using the vapor-permeable means of the mold form and/or other vapor-permeable means than that of the mold form, while heating the CNF-containing slurry and/or putting the CNF-containing slurry under reduced pressure; and repeating a step of additionally charging the CNF-containing slurry into said mold form and the step of the load application in conjunction with the heating and/or the exposure to reduced pressure.

By a method for molding CNFs according to the present invention, a CNF molded product can be provided with one or more portions of CNFs imparted with different properties.

By the method for molding CNFs of the present invention, a CNF molded product of the present invention can be obtained wherein two or more partial CNF phases having different properties are non-junctionally integrated.

The expression "non-junctionally integrated" means that no boundary surface/composition surface is formed between the two or more partial CNF phases having different properties. If boundary surface/composition surface is present between the partial CNF phases, mutual physical entanglement and hydrogen bonding between CNFs in the boundary surface/composition surface are insufficient. The molded product does not exhibit sufficient mechanical strength. For example, if dried CNF sheets are glued together, mutual physical entanglement and hydrogen bonding between CNFs in the composition surface are insufficient. Accordingly, the molded product does not exhibit sufficient mechanical strength.

According to the method for molding CNFs of the present invention, a CNF molded product having a three-dimensional shape can be obtained at a high productivity.

BRIEF DESCRIPTION OF DRAWINGS

As shown in FIG. 1, a porous body 1*a* made of ceramic, a resin or the like is placed in a rectangular parallelepipedal casing 2 made of a stainless steel of which upper side is open to prepare a mold form 3. A CNF-containing slurry 4 is charged into the mold form 3, and a porous body 1*b* also made of ceramic, a resin or the like is placed on the CNF-containing slurry 4. If leakage of the CNF-containing slurry 4 from a gap between the mold form 3 and the upper porous body 1*b* or clogging of the porous bodies 1*a*, 1*b* occurs, such problems can be inhibited by enwrapping the CNF-containing slurry 4 in a mesh or a membrane 5. The upper and lower porous bodies 1*a*, 1*b* are heated and/or put under reduced pressure while applying a load to the CNF-containing slurry for a desired period of time to effect hot pressing, thereby obtaining a desired molded product 6. Incidentally, the casing 2 may be made of the same material as the porous bodies 1*a*, 1*b* instead of the stainless steel. Since the porous bodies 1*a*, 1*b* contain plenty of air therein, time reduction is realized by preliminarily heating the porous bodies 1*a*, 1*b*.

A CNF-containing slurry 4 is charged into a mold form 3 and a porous body 1*b* is placed on the CNF-containing slurry 4 as in the above preparation method. The resultant is heated and/or put under reduced pressure while applying a load to the CNF-containing slurry to effect evaporation to a desired concentration. Then, the porous body 1*b* is removed and an additional CNF-containing slurry is charged into the mold form 3 in an amount of about 10% of the weight of the initially charged CNF-containing slurry. After the porous body 1*b* is placed on the additional CNF-containing slurry, heating and/or exposure to reduced pressure is performed under a load to effect evaporation to a desired concentration. Moreover, a further additional CNF-containing slurry is charged into the mold form in an amount of about 10% of the weight of the initially charged CNF-containing slurry, and heating and/or exposure to reduced pressure is performed under a load to effect evaporation to a desired concentration. By repeating this procedure, a molded product 6 having a desired thickness can be prepared. In this connection, in order to obtain good adhesion between the previously charged CNFs and subsequently added CNFs, it is preferred to maintain somewhat wet state of the previously charged CNFs. Accordingly, the concentration of the previously charged CNF-containing slurry is set to be lower than that of the subsequently charged CNF-containing slurry, in other words, the concentration of the subsequently charged CNF-containing slurry is gradually increased to thereby prepare a molded product 6 having a desired thickness efficiently.

As described above, by laminating CNF layers step by step, a molded product 6 having a desired thickness can be prepared.

When it is intended to impart some properties to the surface of the molded product 6, for example, when it is intended to render the surface hydrophobic, hydrophobized CNFs 4 which have been imparted with hydrophobicity may be used only in the surface region to render the surface of the molded product 6 hydrophobic.

Alternatively (According to an alternative embodiment), in order to maintain CNFs in somewhat wet state, a water may be absorbed or drained from a CNF-containing slurry without either heating or exposure to reduced pressure to concentrate CNF-containing slurry to a desired concentration, and then, the CNF-containing slurry may be heated and/or put under reduced pressure while applying a load to the CNF-containing slurry.

Figure 1:
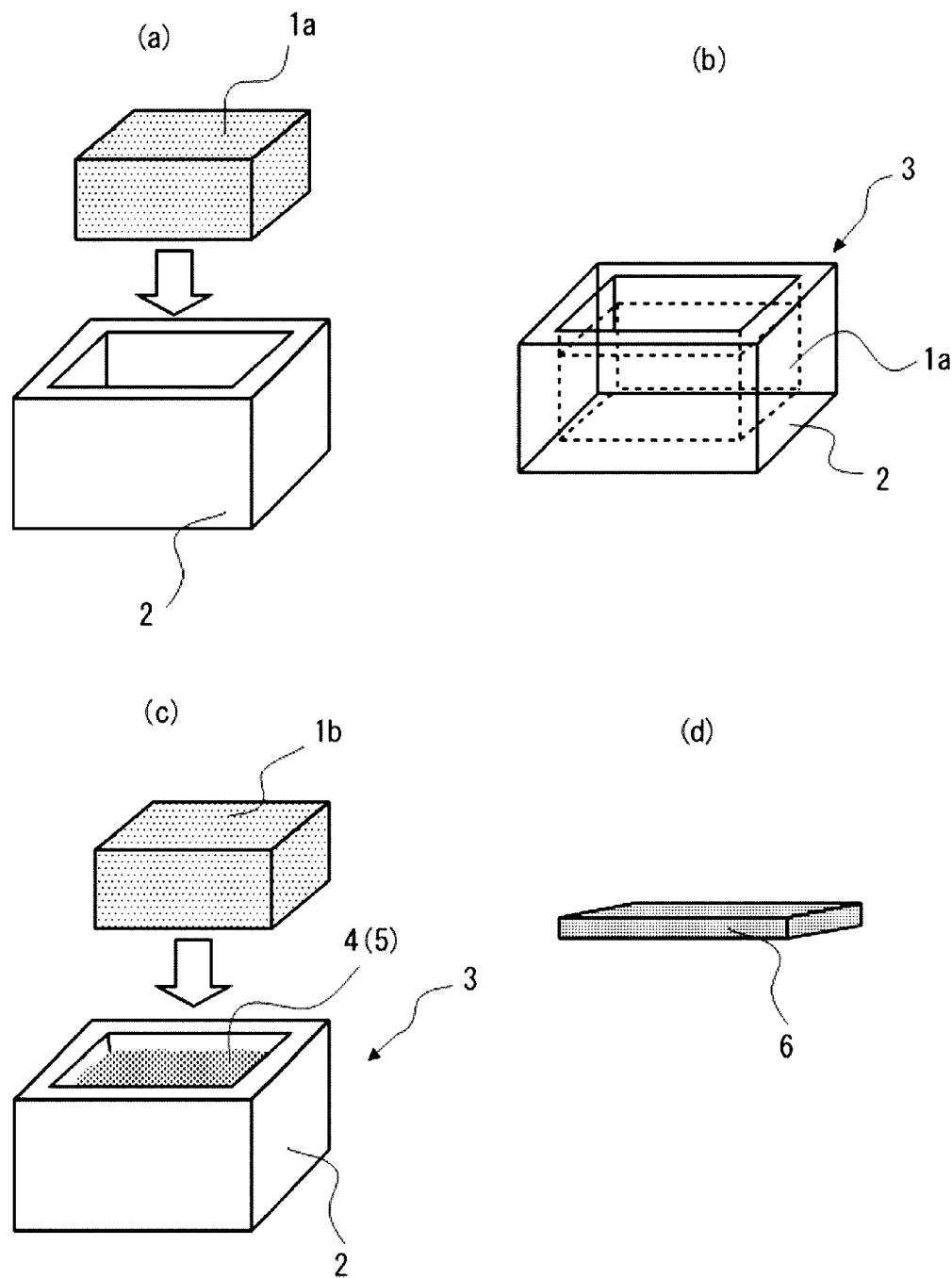
FIG. 1 shows illustrative views of an embodiment of the present invention.
Figure 2:
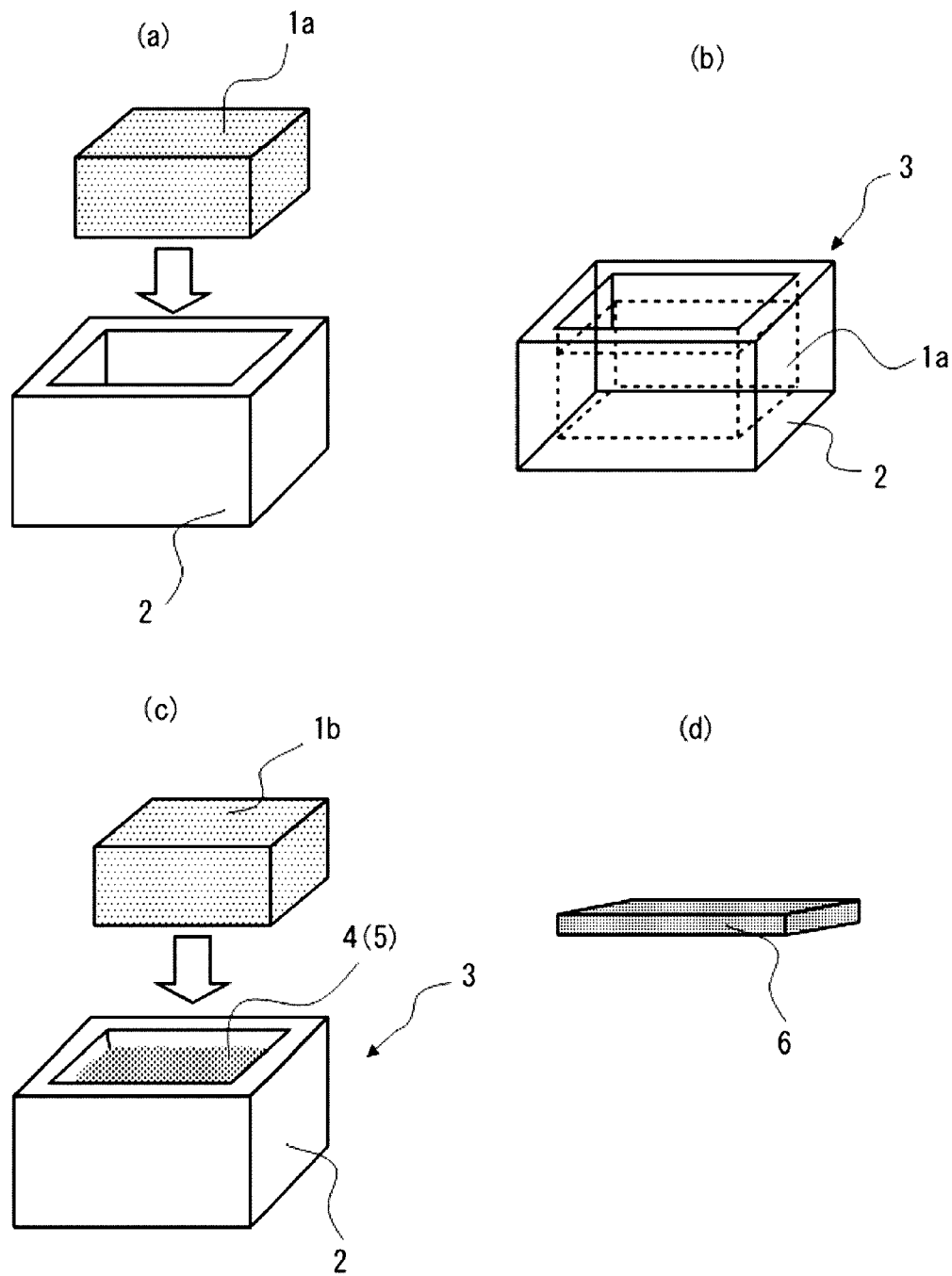
FIG. 2 shows illustrative views of another embodiment of the present invention.

FIG. 2 shows illustrative views of another embodiment of the present invention. A cylindrical porous body 1a made of ceramic, a resin or the like is placed in a cylindrical casing 2 made of a stainless steel of which upper side is open to prepare a mold form 3. A CNF-containing slurry 4 is charged into the mold form 3, and cylindrical porous body 1b also made of ceramic, a resin or the like is placed on the CNF-containing slurry 4 to thereby prepare a cylindrical molded body 6.

The cylindrical casing 2 may be made of the same material as the porous body 1a instead of the stainless steel.

[CNF-Containing Slurry]

In the present invention, as CNF, those derived from a polysaccharide including a natural plant fiber such as a wood fiber, a bamboo fiber, a sugar cane fiber, a seed hair fiber, a leaf fiber or the like may be mentioned. These CNFs may be used alone or in combination.

The CNFs used in the present invention have an average thickness of 4 to 200 nm and an average length of 0.1 μm or more and can be prepared by fibrillating a polysaccharide by means of jets of highly pressurized water.

The fibrillation of a polysaccharide is performed by causing high-pressure jets (about 50 to 400 MPa) of aqueous polysaccharide slurry containing 0.5 to 10% by weight of the polysaccharide to collide with each other.

However, methods for preparing a CNF used in the present invention are not restricted to the above-described method, a CNF used in the present invention may be prepared by other methods, for example, chemical methods such as an acid hydrolysis method and a TEMPO-mediated oxidation method, and physical methods such as a grinder method and a high-pressure homogenizer method.

Figure 3:
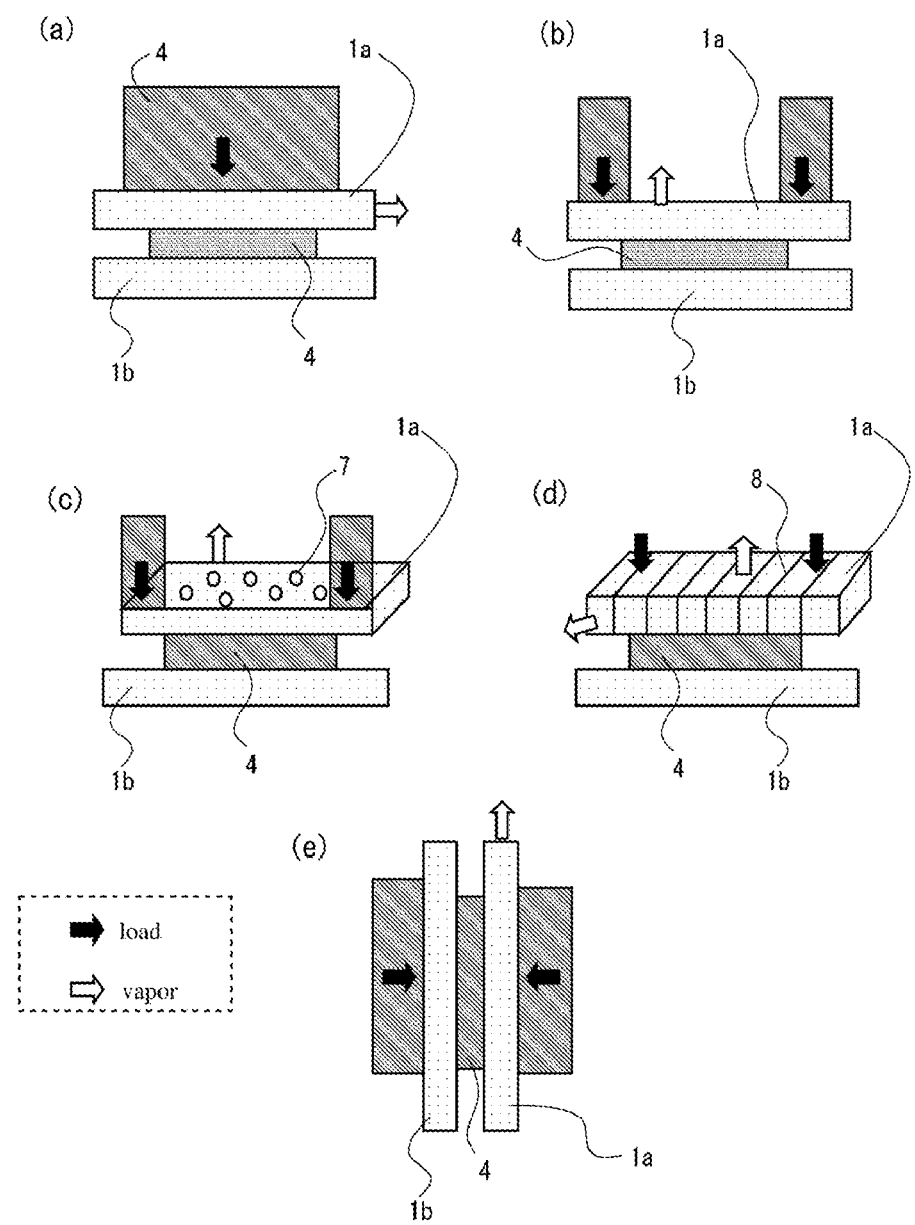
FIG. 3 shows illustrative views of various embodiments of the present invention.

FIG. 3 shows other embodiments of the present invention. FIG. 3(a) shows such an embodiment that a CNF-containing slurry 4 is held between upper and lower porous bodies 1b, 1a and a load is placed on the upper porous body 1b. In this embodiment, steam is caused to escape laterally from the porous bodies 1a, 1b. FIG. 3(b) shows such an embodiment that a CNF-containing slurry 4 is held between upper and lower porous bodies 1b, 1a as in the embodiment in FIG. 3(a), and loads are placed on marginal portions of the upper porous body 1a to permit steam to escape from the upper surface of the upper porous body 1b as well as the sides of the porous bodies 1a, 1b. FIG. 3(c) shows such an embodiment that loads are placed on marginal portions of the upper porous body 1b as in the embodiment in FIG. 3(b), and a plurality of through holes 7 as permeation aids are provided in the upper porous body 1b to permit steam to escape also from the through holes 7, thereby streamlining discharge of steam. FIG. 3(d) shows such an embodiment that a plurality of slits 8 are provided in the upper porous body 1b to permit steam to escape also from the slits 8, thereby streamlining discharge of steam. FIG. 3(e) shows such an embodiment that CNF-containing slurry 4 is vertically held between right and left porous bodies 1a, 1b and loads are laterally applied to the right and left porous bodies 1a, 1b. In this embodiment, steam is permitted to escape upward in the vertical direction from the porous bodies 1a, 1b to streamline discharge of steam.

Figure 4:
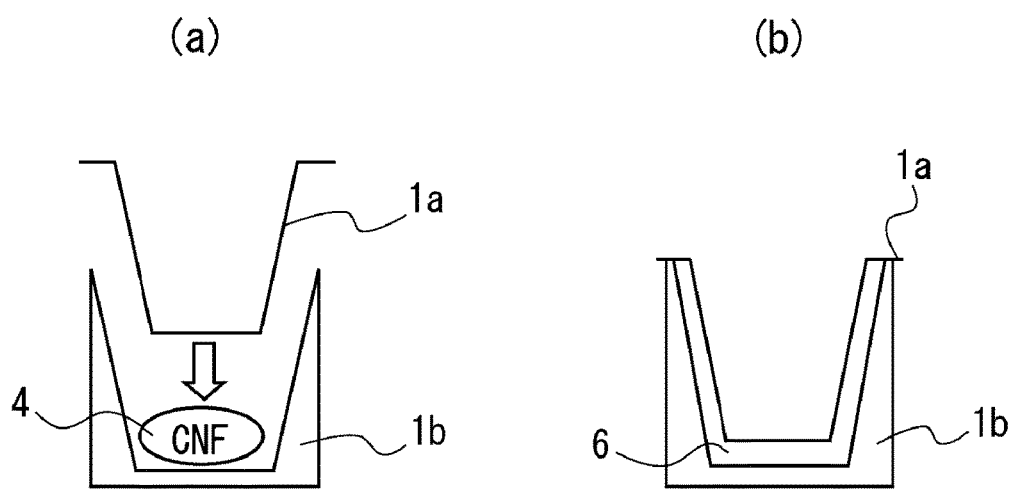
FIG. 4 shows illustrative views of still another embodiment of the present invention.

FIG. 4 shows a further embodiment of the present invention. Molding is carried out under such a condition that CNF-containing slurry 4 is interposed between an upper porous body 1b as a male mold and a lower porous body 1b as a female mold, thereby preparing a molded product 6 having a glass shape.

Figure 5:
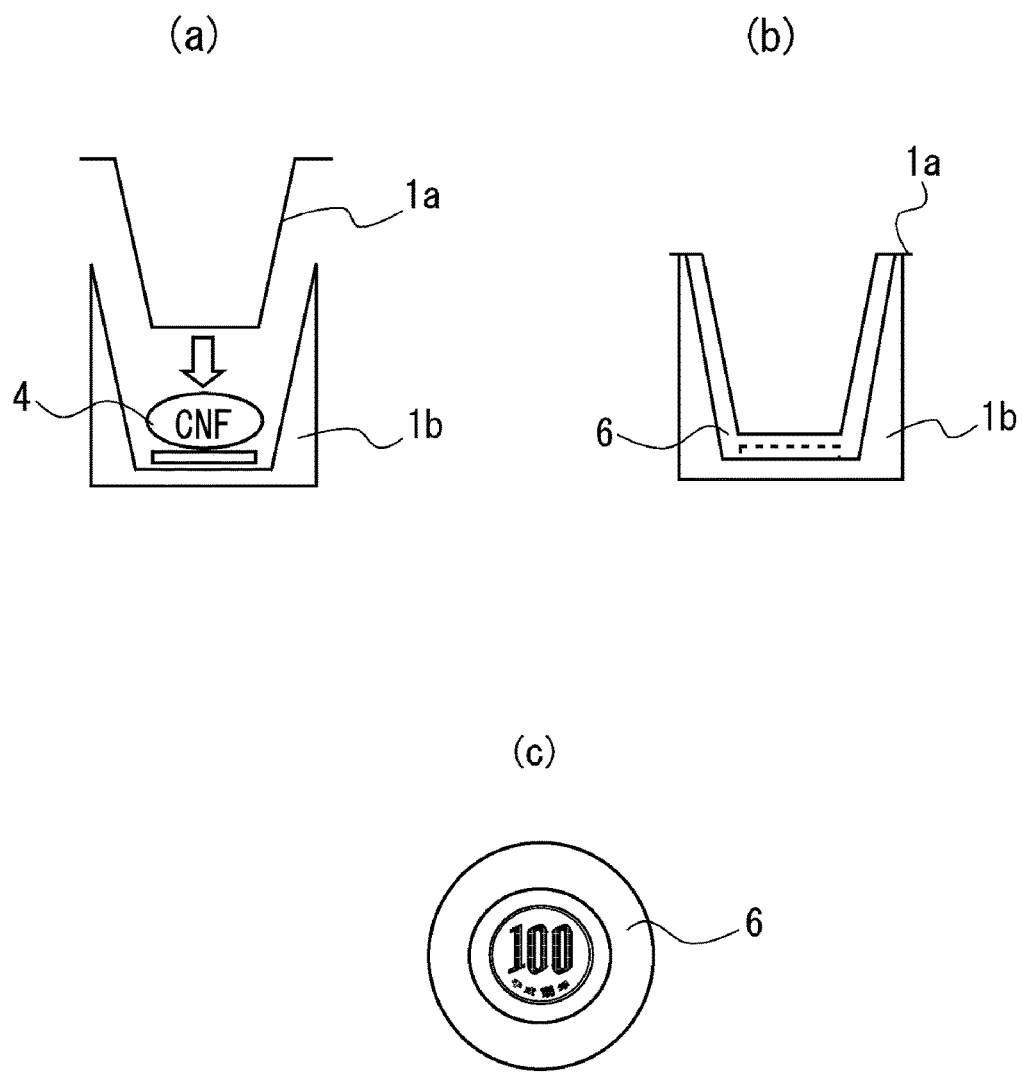
FIG. 5 shows illustrative views of a further embodiment of the present invention.

FIG. 5 shows a still further embodiment of the present invention. In this embodiment, molding is carried out under such a condition that CNF-containing slurry 4 is interposed between an upper porous body 1b as a male mold and a lower porous body 1b as a female mold with a core of a desired shape, for example, a 100-yen coin in the case shown in FIG. 5 disposed between the lower porous body 1b and the CNF-containing slurry 4, thereby preparing a molded product 6 to which the design of the 100-yen coin is transferred.

EXAMPLES

Example 1

A CNF-containing slurry 4 enwrapped in a nylon mesh 5 was charged into a mold form 3 composed mainly of a porous body 1a made of a resin (ultrahigh molecular weight polyethylene (UHMWPE), heatproof temperature: 110° C., average pore diameter: 15 μm, porosity: 30 to 50%) and a rectangular parallelepipedal casing 2 made of a stainless steel and having a wall thickness of about 4 mm, and a porous body 1b made of the same material as the porous body 1a was placed on the CNF-containing slurry 4. The upper and lower porous bodies 1b, 1a were heated to 110° C. for a desired period of time to effect hot pressing while applying a load to the CNF-containing slurry. Molding conditions of the hot pressing are shown in Table 1.

TABLE 1

| Type of Wood | Fibrillation | Concentration of Starting Material % | Basis Weight g/m$^2$ | Size cm | Thickness mm | Load kg | Drying Time h |
|---|---|---|---|---|---|---|---|
| Hardwood | 100 MPa × 10 passes | 13.6 | 1230 | 5 × 9 | about 1 | 200 | 1.5 |
|  |  |  | 1110 | 5 × 9 | about 1 | 400 | 3 |
| Softwood | 180 MPa × 50 passes | 12 | 550 | 5 × 9 | about 0.5 | 400 | 2.5 |
|  |  |  | 2270 | 5 × 9 | about 2 | 800 | 4 |

As shown in Table 1, an aqueous slurry of pulp derived from LB (hardwood) was introduced into opposing two nozzles and jetted therefrom toward one point under a high pressure of 100 MPa and thereby caused to collide. (The resultant was re-introduced into the opposing two nozzles.) This cycle was repeated 10 times (10 passes) to obtain a 13.6% CNF-containing aqueous slurry. 1230 g/m² of the 13.6% CNF aqueous slurry was weighed and charged into the mold form 3 composed of the porous body 1a and the casing 2, and the porous body 1b was placed on the CNF-containing slurry. The upper and lower porous bodies 1b, 1a were heated to 110° C. while applying a load of 200 kg for 1.5 hours to obtain a CNF molded product having a thickness of about 1 mm. The thus obtained CNF molded product was somewhat warped. It is assumed that the CNF molded product was substantially free from the warp at the time of removal from the mold form 3 but somewhat moistened, and accordingly, underwent the warp afterward due to the insufficient dryness. Accordingly, if the CNFs are dried sufficiently while a load is applied to the CNFs, such deformation of the CNFs due to shrinkage can be prevented. Accordingly, when a CNF molded product was obtained in substantially the same manner as above except that 1110 g/m² of the 13.6% CNF-containing aqueous slurry was weighed and charged into a mold form 3 and a load of 400 kg was applied to the CNF-containing aqueous slurry for 3.0 hours, the thus obtained CNF molded product was substantially free from deformation.

An aqueous slurry of pulp derived from NB (softwood) was introduced into opposing two nozzles and jetted therefrom toward one point under a high pressure of 180 MPa and thereby caused to collide. (The resultant was re-introduced into the opposing two nozzles.) This cycle was repeated 50 times (50 passes) to obtain a 12.0% CNF-containing aqueous slurry. 550 g/m² of the 12.0% CNF-containing aqueous slurry was weighed and charged into the mold form 3 composed of the porous body 1a and the casing 2, and the porous body 1b was placed on the CNF-containing aqueous slurry. The upper and lower porous bodies 1b, 1a were heated to 110° C. while applying a load of 400 kg for 2.5 hours to obtain a CNF molded product having a thickness of about 0.5 mm. The thus obtained CNF molded product was also somewhat warped. It is assumed that the drying for 2.5 hours was insufficient and the CNF molded product underwent the warp due to the insufficient dryness. On the other hand, when a CNF molded product was obtained in substantially the same manner as above except that 2270 g/m² of the 12.0% CNF-containing aqueous slurry was weighed and charged into a mold form 3 and a load of 800 kg was applied to the CNF-containing aqueous slurry for 4.0 hours, the thus obtained CNF molded product was substantially free from deformation.

Example 2

In order to maintain CNFs in a partly wet state, water was absorbed from a CNF-containing aqueous slurry by means of Kimtowel (prepared and sold by Nippon Paper Crecia Co., Ltd) without either heating or exposure to reduced pressure to concentrate the CNF-containing aqueous slurry to a desired concentration. Then, the concentrated CNF-containing aqueous slurry was hot pressed (at 90° C. overnight (for 20 hours) under a load of 800 kg) using a mold form 3 somewhat larger than that in Example 1 to prepare a CNF molded product. Molding conditions of the hot pressing are shown in Table 2. Also by this molding process, a CNF molded product with no substantial deformation was obtained.

TABLE 2

| Type of Wood | Fibrillation | Concentration of Starting Material % | Basis Weight g/m² | Size cm | Thickness mm | Load kg | Drying Time h |
|---|---|---|---|---|---|---|---|
| Softwood | 180 MPa × 50 passes | 12 | 2990 | 9.5 × 9.5 | about 3 | 800 | 20 |

In each of the above Examples, heat resistant temperature of the porous bodies made of the resin was 110° C. However, when vapor permeable bodies made of ceramic, a metal or the like which has a higher heat resistant temperature are used, drying temperature can be increased to thereby realize reduction of drying time.

NOTE ON REFERENCE NUMBERS

1 . . . porous body, 2 . . . casing made of a stainless steel, 3 . . . mold form, 4 . . . CNF, 5 . . . nylon mesh, 6 . . . molded product

The invention claimed is:
1. A method for molding CNFs, which comprises steps of:
a charging step of charging a first CNF-containing slurry containing, as a cellulose derived fibrous component, only CNFs having an average thickness of 4 to 200 nm and an average length of 0.1 μm or more into a mold form at least partly composed of a vapor-permeable means;
applying a load to the first CNF-containing slurry using the vapor-permeable means of the mold form and/or vapor-permeable means other than that of the mold form, while heating the CNF-containing slurry and/or putting the CNF-containing slurry under reduced pressure; and
repeating a charging step of subsequently charging a second CNF-containing slurry containing, as a cellulose-derived fibrous component, only CNFs having an average thickness of 4 to 200 nm and an average length of 0.1 μm or more into said mold form while the previously charged CNF-containing slurry is still in a wet state, and the step of the load application in conjunction with the heating and/or the exposure to reduced pressure.
2. The method for molding CNFs according to claim 1, which further comprises:
providing first and second CNF-containing slurries imparted with different properties to obtain a CNF molded product having a three-dimensional shape.
3. The method for molding CNFs according to claim 1, wherein the subsequently charged CNF-containing slurry has a higher concentration then that of a previously charged CNF-containing slurry.

* * * * *